(12) United States Patent
DeLuca et al.

(10) Patent No.: US 11,030,653 B2
(45) Date of Patent: Jun. 8, 2021

(54) DYNAMIC GEOFENCING BASED ON AN AVAILABILITY OF A PRODUCT

(71) Applicant: International Business Machines Corporation, Armonk, NY (US)

(72) Inventors: Lisa Seacat DeLuca, Baltimore, MD (US); Jeremy A. Greenberger, Raleigh, NC (US); Nicholas R. Sandonato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/336,957

(22) Filed: Oct. 28, 2016

(65) Prior Publication Data

US 2018/0121956 A1    May 3, 2018

(51) Int. Cl.
*G06Q 30/02* (2012.01)
*G06Q 10/08* (2012.01)
*H04W 4/021* (2018.01)

(52) U.S. Cl.
CPC ....... *G06Q 30/0261* (2013.01); *G06Q 10/087* (2013.01); *G06Q 30/0267* (2013.01); *H04W 4/021* (2013.01)

(58) Field of Classification Search
CPC .............................. G06Q 30/00; H04W 24/00
USPC ............... 455/456.3, 405, 456.1, 456.2; 340/539.13, 572.1; 709/224; 705/14.58
See application file for complete search history.

(56) References Cited

U.S. PATENT DOCUMENTS

| | | | |
|---|---|---|---|
| 7,940,181 B2 * | 5/2011 | Ramachandra | G06Q 10/087 235/375 |
| 8,301,765 B2 * | 10/2012 | Goodman | G06Q 10/06 370/338 |
| 8,335,524 B2 * | 12/2012 | Shutter | G06Q 30/02 455/456.3 |
| 8,471,701 B2 * | 6/2013 | Yariv | H04W 4/021 340/539.13 |
| 8,812,027 B2 * | 8/2014 | Obermeyer | G08B 21/0277 455/456.1 |
| 9,060,248 B1 | 6/2015 | Coulombe et al. | |
| 9,398,169 B2 | 7/2016 | Mohammed et al. | |
| 2013/0278403 A1 | 10/2013 | Morgan et al. | |
| 2014/0095296 A1 | 4/2014 | Angell et al. | |

(Continued)

FOREIGN PATENT DOCUMENTS

WO    WO-2010025217 A1 *    3/2010    ............. G06Q 10/06

OTHER PUBLICATIONS

Tamara Weintraub, What is Geofencing & Why Should Your Local Business Care?, 2015 (Year: 2015).*

(Continued)

*Primary Examiner* — Tarek Elchanti

(74) *Attorney, Agent, or Firm* — Stephanie Carusillo; Hunter E. Webb; Keohane & D'Alessandro, PLLC

(57) ABSTRACT

Approaches presented herein enable creating a dynamic geofence based on an availability of a product to optimize a flow of customers to a venue. Specifically, a geofence at a venue (e.g., retail outlet, restaurant, ticket office, etc.) is established based on a reference point and an area having a range. A campaign related to a product (e.g., a sales promotion, etc.) is associated with the established geofence. An aspect of the established geofence is dynamically modified based on an availability of the product in order to optimize the flow of customers to the venue.

17 Claims, 7 Drawing Sheets

(56) References Cited

U.S. PATENT DOCUMENTS

| | | | |
|---|---|---|---|
| 2015/0148061 A1* | 5/2015 | Koukoumidis | H04W 4/021 |
| | | | 455/456.1 |
| 2015/0269624 A1 | 9/2015 | Cheng et al. | |
| 2015/0341747 A1* | 11/2015 | Barrand | G06Q 30/0201 |
| | | | 455/405 |
| 2016/0007151 A1* | 1/2016 | Birch | H04W 4/021 |
| | | | 455/456.3 |
| 2016/0105769 A1 | 4/2016 | Dave et al. | |
| 2016/0169696 A1 | 6/2016 | Butts, III et al. | |

OTHER PUBLICATIONS

"3 Tips for Tracking Inventory with GPS", by Resource Nation, Nov. 6, 2012, 6 pages.

* cited by examiner

DYNAMIC GEOFENCING BASED ON AN AVAILABILITY OF A PRODUCT

TECHNICAL FIELD

This invention relates generally to location-based services and, more specifically, to creating a dynamic geofence based on an availability of a product to optimize a flow of customers to a venue.

BACKGROUND

Geofencing typically involves a feature in a software program that uses the global positioning system (GPS) or radio frequency identification (RFID) to define geographical boundaries. Geofencing, or using a geofence, generally involves providing an alert or notification when a person or object enters and/or exits a predefined virtual perimeter or boundary threshold. Geofencing has been used in connection with location-based service applications or social networking applications to transmit content, such as coupons or "check-in" status, to users of the respective applications.

SUMMARY

In general, embodiments of the present invention enable creating a dynamic geofence based on an availability of a product to optimize a flow of customers to a venue. Specifically, a geofence at a venue (e.g., retail outlet, restaurant, ticket office, etc.) is established based on a reference point and an area having a range. A campaign related to a product (e.g., a sales promotion, etc.) is associated with the established geofence. An aspect of the established geofence is dynamically modified based on an availability of the product in order to optimize the flow of customers to the venue.

One aspect of the present invention includes a computer-implemented method for creating a dynamic geofence related to a venue, the method comprising: establishing, based on a reference point and an area having a range, the dynamic geofence; associating a campaign related to a product with the dynamic geofence; and optimizing a flow of customers to the venue by modifying an aspect of the dynamic geofence based on an availability of the product.

Another aspect of the present invention includes a computer program product for creating a dynamic geofence related to a venue, and program instructions stored on the computer readable storage device, to: establish, based on a reference point and an area having a range, the dynamic geofence; associate a campaign related to a product with the dynamic geofence; and optimize a flow of customers to the venue by modifying an aspect of the dynamic geofence based on an availability of the product.

Yet another aspect of the present invention includes a computer system for creating a dynamic geofence related to a venue, the computer system comprising: a memory medium comprising program instructions; a bus coupled to the memory medium; and a processor for executing the program instructions, the instructions causing the system to: establish, based on a reference point and an area having a range, the dynamic geofence; associate a campaign related to a product with the dynamic geofence; and optimize a flow of customers to the venue by modifying an aspect of the dynamic geofence based on an availability of the product.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
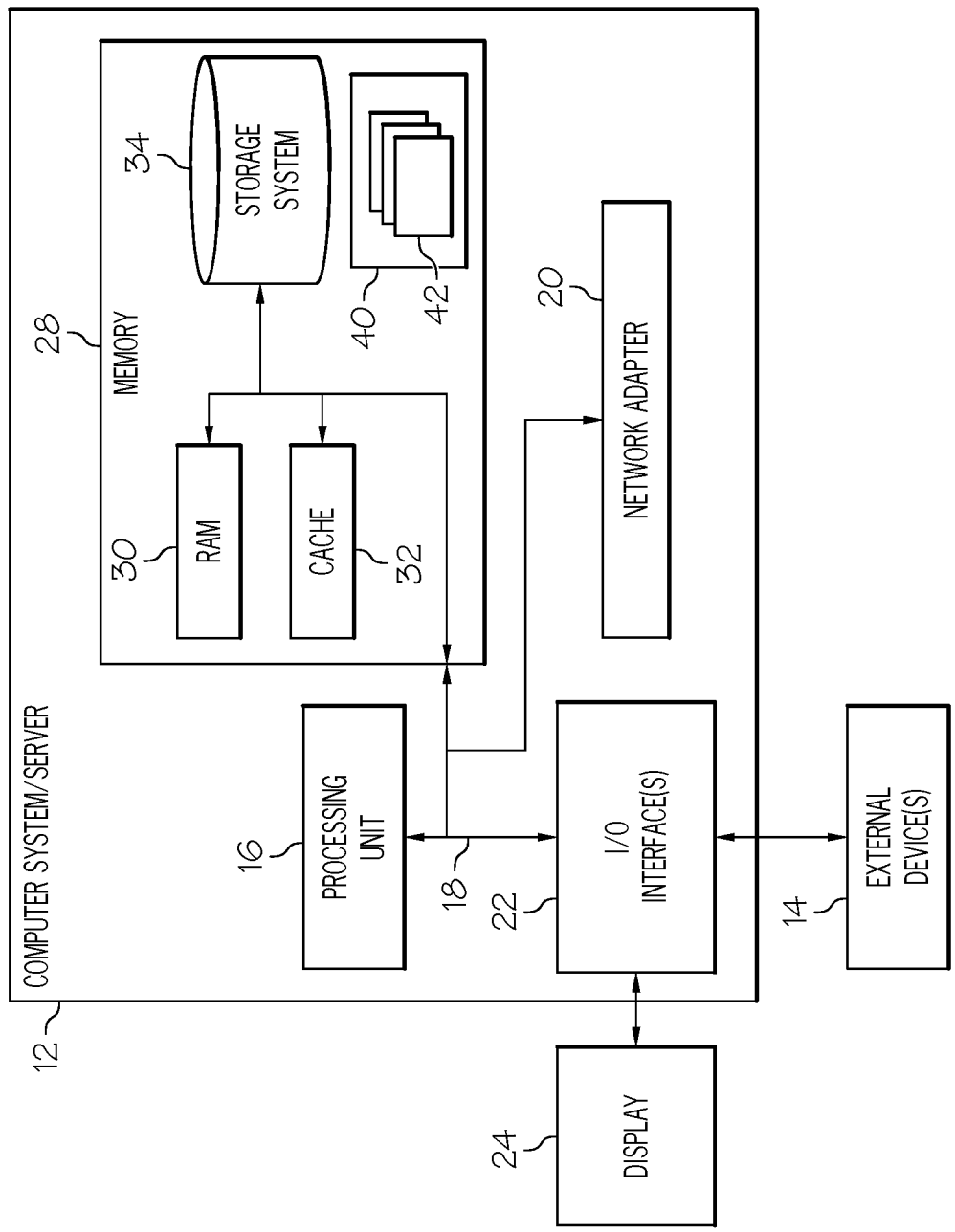
FIG. 1 shows an architecture 10 in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments of the present invention enable creating a dynamic geofence based on an availability of a product to optimize a flow of customers to a venue. Specifically, a geofence at a venue (e.g., retail outlet, restaurant, ticket office, etc.) is established based on a reference point and an area having a range. A campaign related to a product (e.g., a sales promotion, etc.) is associated with the established geofence. An aspect of the established geofence is dynamically modified based on an availability of the product in order to optimize the flow of customers to the venue.

Geofencing uses global positioning satellite (GPS) coordinates to encapsulate a geographic area and takes a mobile device user's (who has opted in to receive push notifications via a mobile device) location data via GPS to determine his/her proximity to that particular region (whether they are inside or outside or if they just went in and came out of that particular area in a matter of seconds). A typical function of geofencing is to allow marketers to send messages to mobile device users when the users enter a defined geographic area, such as a retail store, stadium, shopping mall, etc. Part of this technology involves setting a transmittal range for who will receive these notifications.

The inventors of the invention described herein have recognized certain deficiencies in known methods for defining a geofence. Many common geofencing scenarios (i.e., static geofences) are based on a simple radius around a point of interest, like a retail location. Using a static geofence may diminish the very power of using location data in a mobile marketing campaign. For example, it may be helpful to retailers to allow an availability of a particular product to determine the range of the geofence. By doing this, a retailer can attract more customers to targeted products based on its availability. The approaches described herein provide a seamless way for creating a dynamic geofence based on an availability of the product.

In certain embodiments, an advantage of this approach is its reduction of computing overhead. Computing overhead is generally considered any combination of excess or indirect computation time, memory, bandwidth, or other resources that are required to attain a particular goal. By optimizing the consumption of computing resources by modifying the range of the area of the geofence at a venue, the computing overhead is reduced to only what is necessary to attract a desired number of customers. Also, by reducing consumption of computing resources, this approach increases the number of users (i.e., system capacity) that can be accommodated. Further, the relevance of a given geofence to a user's mobile device impacts the consumption of resources on the mobile device itself, since the geofence is dynamic.

This approach also improves the fundamental operation of the system as a whole. The geofence is defined dynamically to include a decreased geographic size so as to limit the exposure of the offer, or in other situations the geographic size is expanded so as to increase the exposure of the offer. This approach optimizes the flow of potential customers to the particular venue. Having a geographic size too small may prevent attracting a desired number of customers to the venue. Having a geographic size too large may present other issues, such as wasted computing resources, both of the system itself and mobile devices of those within the geofence, as discussed above.

In addition, if the venue were to turn away would-be customers, then this action may affect the reputation of the venue with those turned away by increasing negative sentiment with those would-be customers. However, by dynamically defining the geographic size of the geofence based on an availability of a product, this approach provides optimal throughput of customers to the venue while reducing the likelihood of generating negative sentiment. As such, there exists a geographic size that is predicted to attract the desired number of customers to the venue and still minimizes consumption of computing resources to within a threshold (i.e. the geographic size is optimal).

Referring now to FIG. 1, a computerized implementation 10 of an embodiment for creating a dynamic geofence based on an availability of a product to optimize a flow of customers to a venue will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for creating a dynamic geofence based on an availability of a product to optimize a flow of customers to a venue. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for creating a dynamic geofence based on an availability of a product to optimize a flow of customers to a venue, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
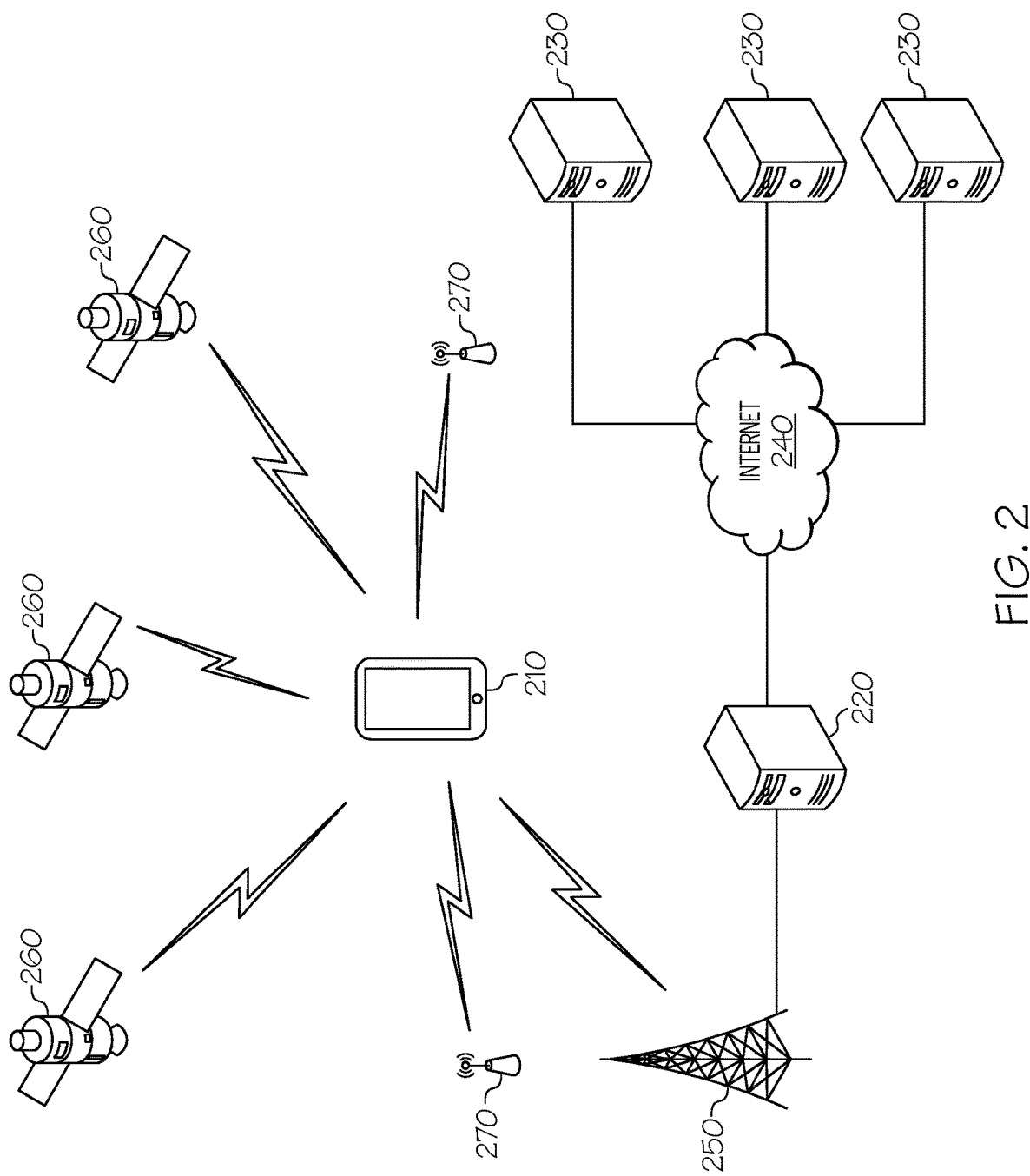
FIG. 2 shows a first schematic diagram 200 illustrating an exemplary environment for implementation according to illustrative embodiments.

FIG. 2 shows schematic diagram 200 illustrating an exemplary environment for performing geofencing actions. As depicted in FIG. 2, diagram 200 includes a geofencing server 220 connected via one or more data communication links to a plurality of content servers 230. Geofencing server 220 may communicate with content servers 230 via a data network such as the Internet using TCP/IP or any other suitable data packet-switching protocol. HTTP requests to content servers 230 may be sent by geofencing server 220 to retrieve content from content servers 230.

As shown in FIG. 2, the geofencing server 220 is also connected to a mobile device 210. Geofencing server 220 may communicate with mobile device 210 through a data network, e.g., the Internet 240, and via a wireless network that includes a base transceiver station 250 for radio frequency (RF) communication with mobile device 210 using GSM, LTE, CDMA, or any other cellular technology. Data packet transmission over the air may be accomplished using GPRS, EDGE, Evolved EDGE, HSPA, etc. Instead of a single geofencing server (i.e., geofencing server 220), there may be a server cluster, server farm, or cloud environment functioning as the geofencing server in other embodiments.

As further depicted in FIG. 2, GPS (or other GNSS) satellites 260 transmit signals (e.g., RF signals) to mobile device 210 to enable mobile device 210 to generate current location data representing the current location of the mobile device. Current location data may also be obtained using other techniques. For example, Wi-Fi positioning based on nearby Wi-Fi routers 270 may be used. Other location techniques may be employed to determine location data (e.g., using cellular RF signals from the nearby base station transceiver(s) 250).

Figure 3:
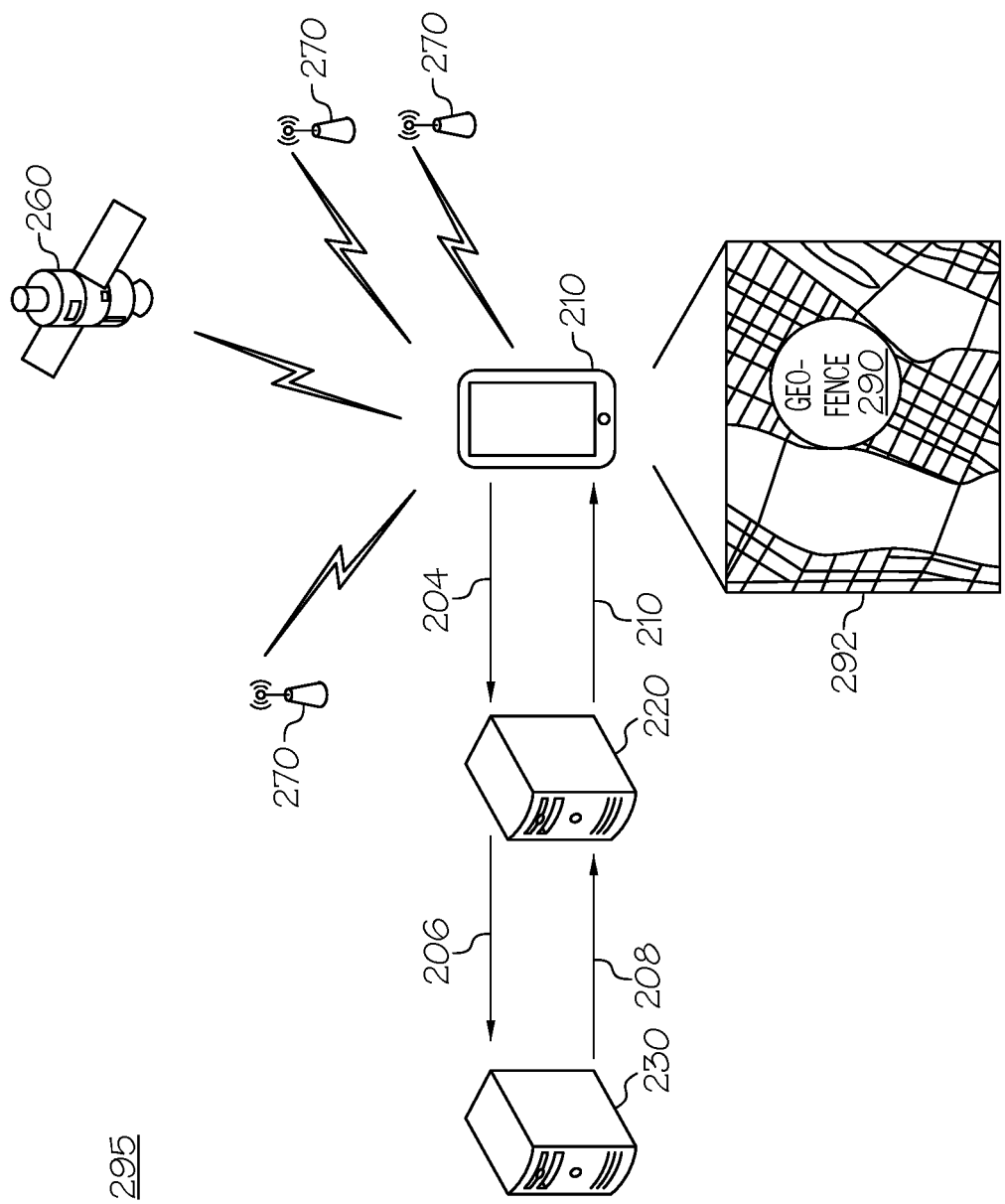
FIG. 3 shows a second schematic diagram 295 illustrating an exemplary environment for implementation according to illustrative embodiments.

FIG. 3 depicts a data flow (or message flow) 295 in the system of FIG. 2. In this example, there is a circular geofence 290 for an area in a city or metropolitan area, although the shape of the geofence and the fact that it is in a city or metropolitan area (as opposed to a suburban or rural area) is arbitrary. Geofence 290 may be drawn by an authorized user or selected from predetermined geofences by the authorized user. An authorized user may include a marketing manager or other person having the proper credentials to perform the function. The geofence may also be displayed on a map 292 of the city or area to enable the user to view the extent or scope of geofence 290. In operation, mobile device 210 may determine its current location based on signals from the GPS satellites 260 or Wi-Fi routers 270 (or by using other position-determining techniques). Mobile device 210 transmits current location data (message 204) to geofencing server 220. Message 204 may be sent periodically, intermittently, or based on a schedule.

Geofencing server 220 receives the location data from mobile device 210, determines whether any geofence conditions are met (the device has entered a geofence, has left a geofence, has continued to remain inside a geofence, etc.) Geofencing server 220 then obtains the data required for the geofence. This data may be cached at geofencing server 220, but in most cases, geofencing server 220 will obtain this required data from one or more content servers 230. A request 206 is thus sent by the geofencing server 220 to the appropriate content server 230. A response 208 is sent back from the content server 230 to geofencing server 220, which may cache this data for mobile device 210. Geofencing server 220 then sends or pushes the data (via message 210 in the form of a datagram or data packets) to mobile device 210 either immediately upon receipt from content server 230, based on a push schedule, or in response to a request from mobile device 210 to download any available data. Mobile device 210 then uses or displays the content or performs any device-executable actions.

FIGS. 2-3 include a depiction of a wireless communications device as one example of a mobile device that may be used in conjunction with the functions described herein. Examples of a mobile device or wireless communications device include cell phones, smart phones, mobile phones, portable digital assistants, tablets, notebooks, laptops, or any other such portable or handheld electronic communications devices.

Figure 4:
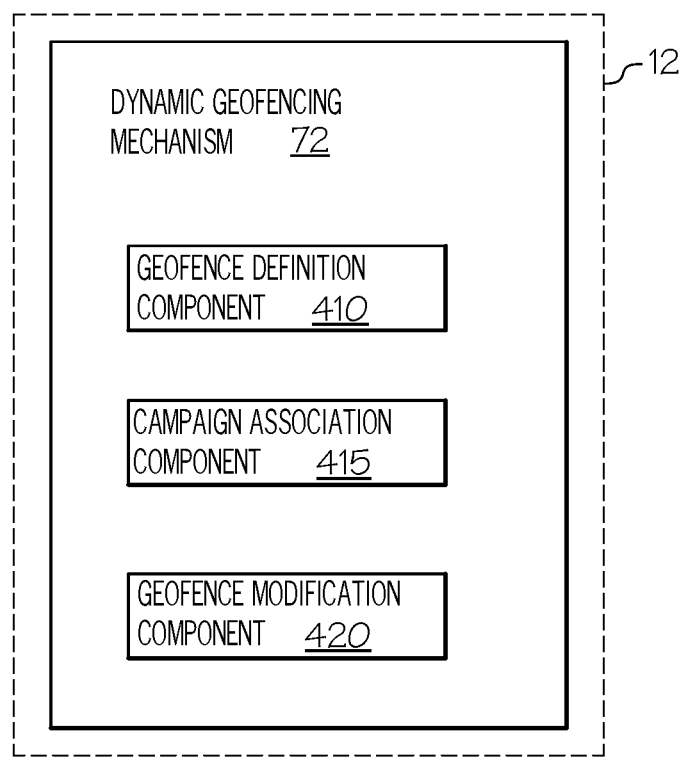
FIG. 4 shows a block diagram 400 illustrating a dynamic geofencing mechanism 72 according to illustrative embodiments.

Referring now to FIG. 4, block diagram 400 describing the functionality discussed herein according to an embodiment of the present invention are shown. It is understood that the teachings recited herein may be practiced within any type of computing environment (e.g., computer system/server 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have a dynamic geofencing mechanism 72 (hereinafter "system 72"). Rather, system 72 could be loaded on a server (e.g., geofencing server 220) or server-capable device that communicates (e.g., wirelessly) with the physical server to provide the functions described herein. Regardless, as depicted, system 72 can be implemented as program/utility 40 on computer system/server 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 4 for brevity purposes.

Figure 5A:
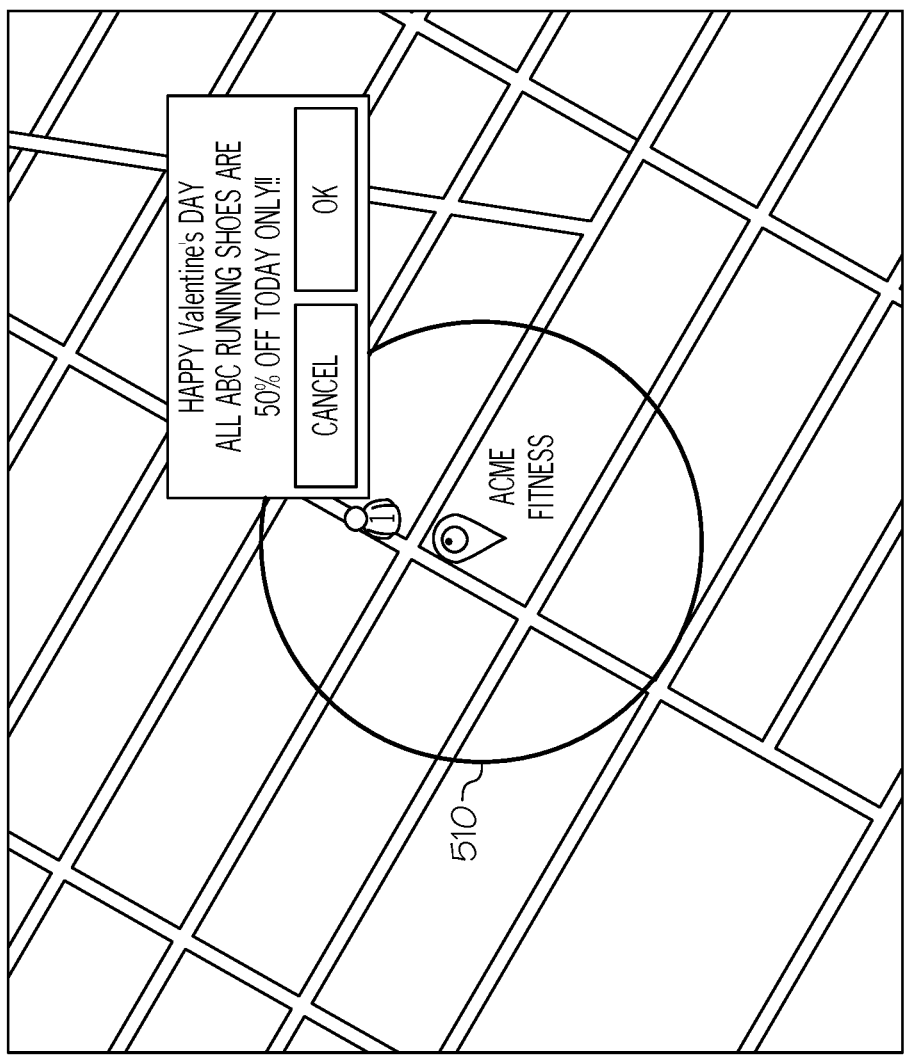
FIG. 5A shows an example map 500 according to illustrative embodiments.
Figure 5B:
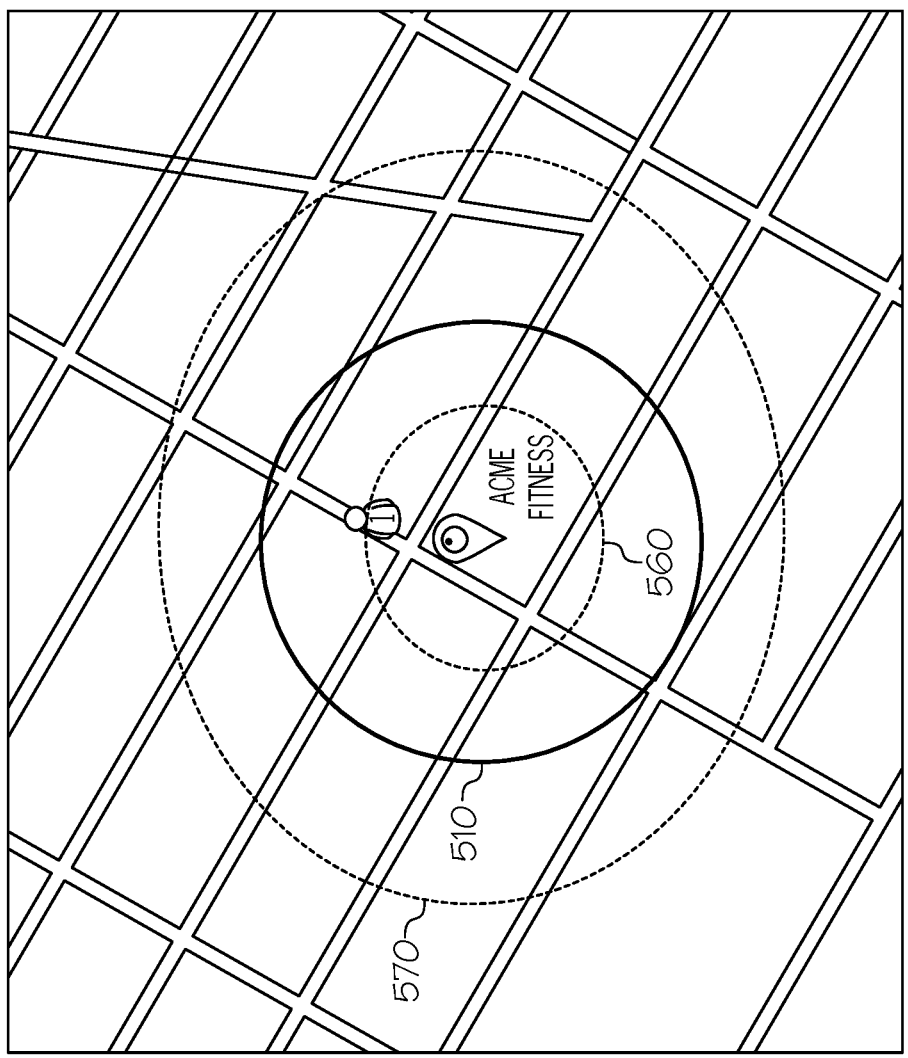
FIG. 5B shows an example map 550 according to illustrative embodiments.

Consider the example described below. ACME Fitness, a sporting goods retailer, wants to promote a particular product (e.g., ABC brand running shoes) by creating a dynamic geofence to enable push notifications to mobile device users who have opted in to the service. Referring now to FIGS. 5A-B, in conjunction with FIG. 4, geofence definition component 410 of system 72, as executed by computer system/server 12, is configured to define a geofence based on input (e.g., center point location, range, etc.) received from an authorized user (e.g., marketing manager). An initial geofence may be defined and established based on a reference point, for example using GPS data comprising latitude and longitude along with some predetermined area based on range or distance. In this manner, the authorized user need not manually specify a location by drawing a perimeter, specifying a point location, or by any other means. In an embodiment, system 72 may receive input from an authorized user via a user interface (not shown) displayed on display 24.

As shown, circular geofence 510 is defined with a reference point (i.e., center point) located at the front of ACME Fitness with a radius of 400 feet (or about 1.5 city blocks). A large geofence is initially established to attract a large number of potential customers to the sale of the ABC brand running shoes. In an embodiment, geofence 510 is displayed on map 500 of an area to enable the authorized user to view the extent or scope of geofence 510. In the current example, geofence 510 is a circle with a radius defined in feet. In other embodiments, the geofence area can be any polygon with a range of the area defined in any standard unit of measure, such as miles, meters, feet, yards, or the like.

Campaign association component 415 of system 72, as executed by computer system/server 12, is configured to associate a campaign (e.g., a sales or marketing campaign) related to one or more products with a defined geofence. As used herein, the term "product" includes any good or service offered for sale at a venue. After a campaign has been associated with a geofence, mobile device users who have opted in to receive push notifications via a mobile device may receive information related to the campaign (e.g., product information, specials or discounts, etc.) when entering the geofence. In an embodiment, a campaign may be associated with a geofence via a user interface. In the ACME Fitness example, an authorized user of ACME Fitness may associate the sales campaign of the ABC brand running shoes with geofence 510 to attract potential customers. After the sales campaign has been associated with geofence 510, any mobile device users who have opted in to receiving push notifications may receive information related to the campaign (e.g., sale prices, specials, or discounts, etc.) when entering geofence 510.

Geofence modification component 420 of system 72, as executed by computer system/server 12, is configured to modify one or more aspects (as discussed below) of an established geofence based on an availability of a product. Product availability may be defined based on an inventory of the product which may include the number of units of the product that are ready or will be ready for sale. In a typical embodiment, the availability of a product is based on a current remaining inventory of the product. In an embodiment, geofence modification component 420 may receive inventory data from a products database (not shown) which may be coupled to computer system/server 12. The products database may provide storage for a list of products including inventory data associated with each product.

Referring back to the ACME Fitness example, assume a notification related to the campaign (i.e., sale offer) is pushed to all mobile devices entering into geofence 510 who have opted into the service. Shortly after the campaign begins, customers begin buying the running shoes at the discounted rate that is provided with the sale offer that is pushed to the mobile devices of the customers. Using the proposed invention, geofence modification component 420 tracks the inventory of the running shoes and recognizes that the inventory has fallen below a predefined reduction threshold such that it no longer needs to attract quite as many people. Therefore, geofence modification component 420 modifies an aspect of geofence 510 based on the remaining availability of the product.

In one example, the system dynamically begins pushing the sale offer to only a reduced number (or subset) of mobile devices within geofence 510 to account for the need to attract fewer customers. For example, assume the inventory of the ABC running shoes begins at 1,000 pairs of shoes and a reduction threshold is defined at 100 pairs of running shoes. When the inventory is reduced to below 100 pairs of running shoes, the sale offer begins being pushed to only a subset of all mobile devices within geofence 510 rather than all mobile devices. In an embodiment, the subset may be defined based on a predefined percentage of users, a specific demographic of users (e.g., age, gender, marital status, etc.), or the like. For example, when the inventory reaches 100 or below, the sale offer is pushed to only 10% of the available mobile devices within geofence 510.

In another embodiment, a range of an area of a geofence may be reduced when a remaining inventory of a product falls below a predefined a threshold. Referring again to the ACME Fitness example, if the inventory falls below 100 pairs (i.e., predefined reduction threshold), the radius of geofence 510 may be dynamically reduced from 400 feet to 200 feet (e.g., radius 560 of FIG. 5B) due to the need to attract fewer customers. Any number of thresholds may be defined (e.g., via a graphical user interface screen accessible by an authorized user). For example, a second predefined reduction threshold of 50 pairs of running shoes with a threshold radius of 50 feet may be defined for geofence 510 so that if/when the remaining inventory falls below 50 pairs, then the radius of geofence 510 will be dynamically reduced again, this time to 50 feet.

In yet another embodiment, a range of an area of a geofence may be expanded, rather than reduced, based on an availability of a product. In the ACME Fitness example, if the inventory of the running shoes remains above a predefined expansion threshold for a predefined amount of time, the radius of geofence 510 may be dynamically increased to attract more customers. In this case, a duration of time or date/time may be specified along with the expansion threshold. For example, if the inventory remains above the expansion threshold for the first two hours of the campaign, then the radius may be expanded. In other words, if the inventory remains above 490 pairs for the first two hours of the campaign, then the radius of geofence 510 may be expanded to 600 feet (e.g., radius 570 of FIG. 5B) to attract more customers to the sale.

In an embodiment, geofence modification component 420 continues tracking the inventory of the running shoes and recognizes that the inventory has fallen below a removal threshold such that it no longer needs to attract any additional customers. When a product from a campaign goes out of stock or nearly out of stock, a geofence may become of little or no value. Due to mobile device limitations that limit the number of active geofences and to not exceed the availability of the product, it becomes extremely important that these geofences are managed efficiently. Since it may be easy for a person to forget to manually remove or disable an established geofence, it is imperative that these geofences be cleaned up (i.e., remove/disable) through automated means when no longer needed. Referring again to the ACME Fitness example, assume a removal threshold is defined at five pairs of running shoes. When the current inventory dips below five pairs of running shoes, the system dynamically removes geofence 510.

Figure 6:
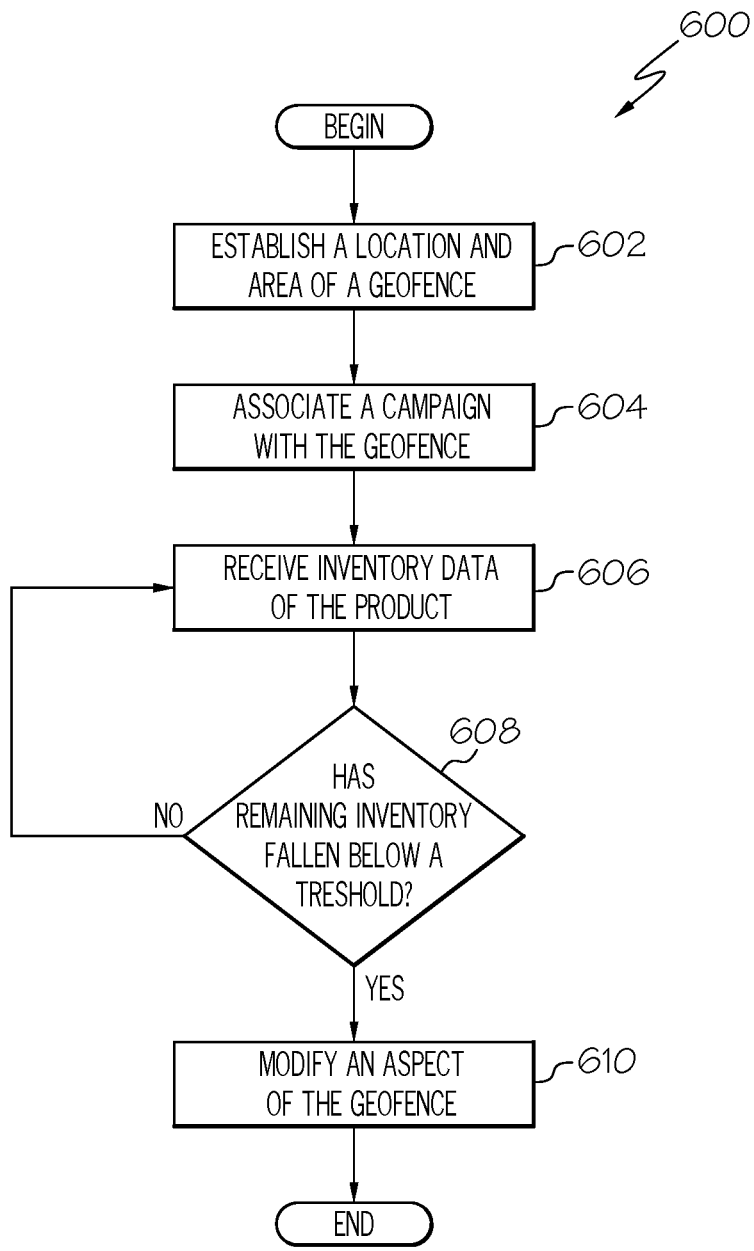
FIG. 6 shows a process flowchart 600 for creating a dynamic geofence based on an availability of a product to optimize a flow of customers to a venue according to illustrative embodiments.

Referring now to FIG. 6, in conjunction with FIG. 4, an implementation of a process flowchart 600 for creating a dynamic geofence based on an availability of a product to optimize a flow of customers to a venue is shown. At step 602, geofence definition component 410 established a geofence at a venue including a location and area of the geofence. At step 604, campaign association component 415 associates a campaign of a product (e.g., a sales promotion) with the established geofence. At step 606, geofence modification component 420 receives inventory data related to the associated product. At step 608, a determination is made whether the remaining product inventory has fallen below a predefined unit threshold. If so, at step 610, an aspect of the geofence is modified based on the remaining inventory.

Process flowchart 600 of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for creating a dynamic geofence based on an availability of a product to optimize a flow of customers to a venue. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for creating a dynamic geofence based on an availability of a product to optimize a flow of customers to a venue. In this case, the service provider can create, maintain, support, etc., a computer infrastructure that performs the process steps of the invention for one or more consumers. In return, the service provider can receive payment from the consumer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and routes the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for creating a dynamic geofence based on an availability of a product to optimize a flow of customers to a venue. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for creating a dynamic geofence related to a venue, the method comprising:
    establishing, by a geofencing server connected via at least one data communication link to a plurality of content servers, the dynamic geofence based on a reference point and an area having a range;
    associating, by the geofencing server, a campaign related to a product with the dynamic geofence, the campaign promoting the product being sold at the venue;
    monitoring, by the geofencing server, a number of remaining units of the product at the venue; and
    automatically optimizing a flow of customers to the venue by modifying an aspect of the dynamic geofence based on an availability of the product, by utilizing GPS satellite location information communicated from a plurality of mobile devices to the geofencing server to:
        reduce a percentage of mobile devices within the range that are receiving the promotion in response to a determination that the number of remaining units at the venue is below a predefined reduction threshold; and
        expand the range of the area in response to a determination that the number remaining units at the venue remains above a predefined expansion threshold for a predefined period of time.

2. The computer-implemented method of claim 1, wherein the availability of the product includes a remaining inventory of the product.

3. The computer-implemented method of claim 1, further comprising transmitting a notification related to the campaign to a number of mobile devices within the area of the dynamic geofence.

4. The computer-implemented method of claim 3, wherein modifying an aspect of the dynamic geofence includes transmitting the notification to a reduced number of mobile devices within the area of the dynamic geofence when the remaining inventory falls below a predefined reduction threshold.

5. The computer-implemented method of claim 2, wherein modifying an aspect of the dynamic geofence includes reducing the range of the area of the dynamic geofence when the remaining inventory falls below a predefined reduction threshold.

6. The computer-implemented method of claim 1, further comprising removing the dynamic geofence when the remaining inventory falls below a predefined removal threshold.

7. A computer readable storage device having a computer program product for creating a dynamic geofence related to a venue comprising program instructions stored on the computer readable storage device, which, when executed by a computer device, are configured to:
    establish, by a geofencing server connected via at least one data communication link to a plurality of content servers, the dynamic geofence based on a reference point and an area having a range;
    associate, by the geofencing server a campaign related to a product with the dynamic geofence, the campaign promoting the product being sold at the venue;
    monitor, by the geofencing server a number of remaining units of the product at the venue;
    automatically optimize a flow of customers to the venue by modifying an aspect of the dynamic geofence based on an availability of the product, by utilizing GPS satellite location information communicated from a plurality of mobile devices to the geofencing server to:
        reduce a percentage of mobile devices within the range that are receiving the promotion in response to a determination that the number of remaining units at the venue is below a predefined reduction threshold; and expand the range of the area in response to a determination that the number remaining units at the venue remains above a predefined expansion threshold for a predefined period of time.

8. The computer readable storage device of claim 7, wherein the availability of the product includes a remaining inventory of the product.

9. The computer readable storage device of claim 7, further comprising program instructions to transmit a notification related to the campaign to a number of mobile devices within the area of the dynamic geofence.

10. The computer readable storage device of claim 9, wherein modifying an aspect of the dynamic geofence includes transmitting the notification to a reduced number of mobile devices within the area of the dynamic geofence when the remaining inventory falls below a predefined reduction threshold.

11. The computer readable storage device of claim 8, wherein modifying an aspect of the dynamic geofence includes reducing the range of the area of the dynamic geofence when the remaining inventory falls below a predefined reduction threshold.

12. The computer readable storage device of claim 7, wherein the reference point includes a latitude coordinate and a longitude coordinate and a measurement associated with the range is selected from a group consisting of feet, yards, meters, and miles.

13. A computer system for creating a dynamic geofence related to a venue, the computer system comprising:
  a memory medium comprising program instructions;
  a bus coupled to the memory medium; and
  a processor for executing the program instructions, the instructions causing the system to:
    establish, by a geofencing server connected via at least one data communication link to a plurality of content servers, the dynamic geofence based on a reference point and an area having a range;
    associate, by the geofencing server, a campaign related to a product with the dynamic geofence, the campaign promoting the product being sold at the venue;
    monitor, by the geofencing server, a number of remaining units of the product at the venue;
    automatically optimize a flow of customers to the venue by modifying an aspect of the dynamic geofence based on an availability of the product, by utilizing GPS satellite location information communicated from a plurality of mobile devices to the geofencing server to:
      reduce a percentage of mobile devices within the range that are receiving the promotion in response to a determination that the number of remaining units at the venue is below a predefined reduction threshold; and
      expand the range of the area in response to a determination that the number remaining units at the venue remains above a predefined expansion threshold for a predefined period of time.

14. The computer system of claim 13, wherein the availability of the product includes a remaining inventory of the product.

15. The computer system of claim 13, further comprising program instructions to transmit a notification related to the campaign to a number of mobile devices within the area of the dynamic geofence.

16. The computer system of claim 15, wherein modifying an aspect of the dynamic geofence includes transmitting the notification to a reduced number of mobile devices within the area of the dynamic geofence when the remaining inventory falls below a predefined reduction threshold.

17. The computer system of claim 14, wherein modifying an aspect of the dynamic geofence includes reducing the range of the area of the dynamic geofence when the remaining inventory falls below a predefined reduction threshold.

* * * * *